Aug. 31, 1954  N. R. EMERY  2,687,655
GEARED HAND BRAKE
Filed May 23, 1951
2 Sheets-Sheet 2
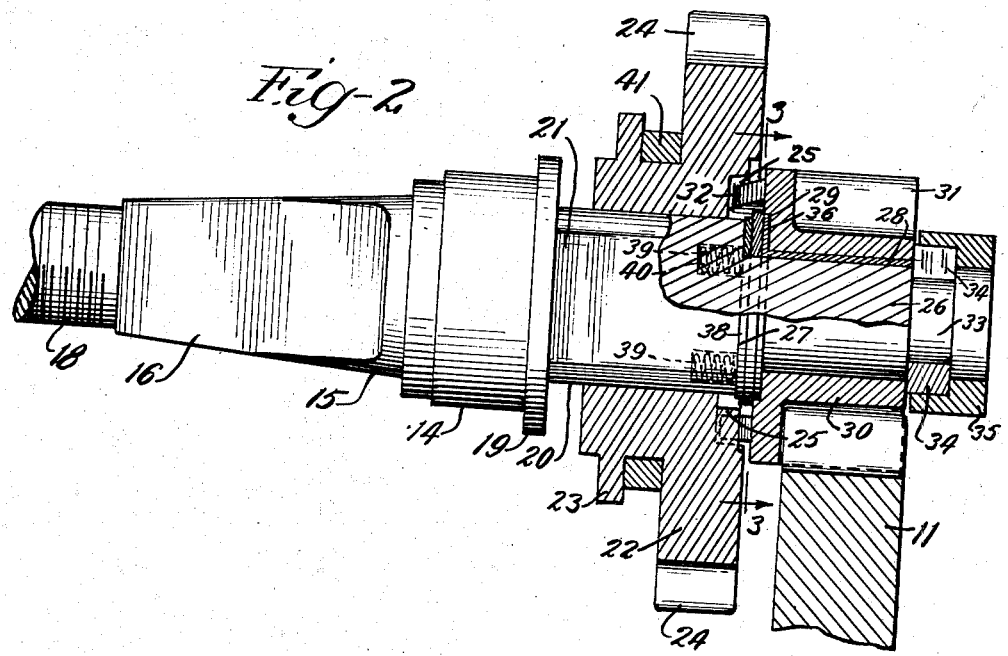
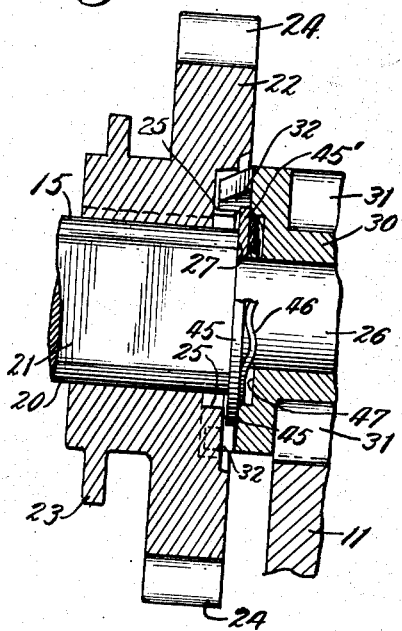
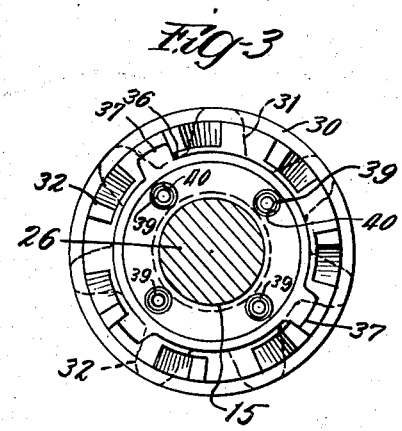
INVENTOR.
Neville R. Emery
BY
Cromwell, Greist & Warden,
Attys Patented Aug. 31, 1954

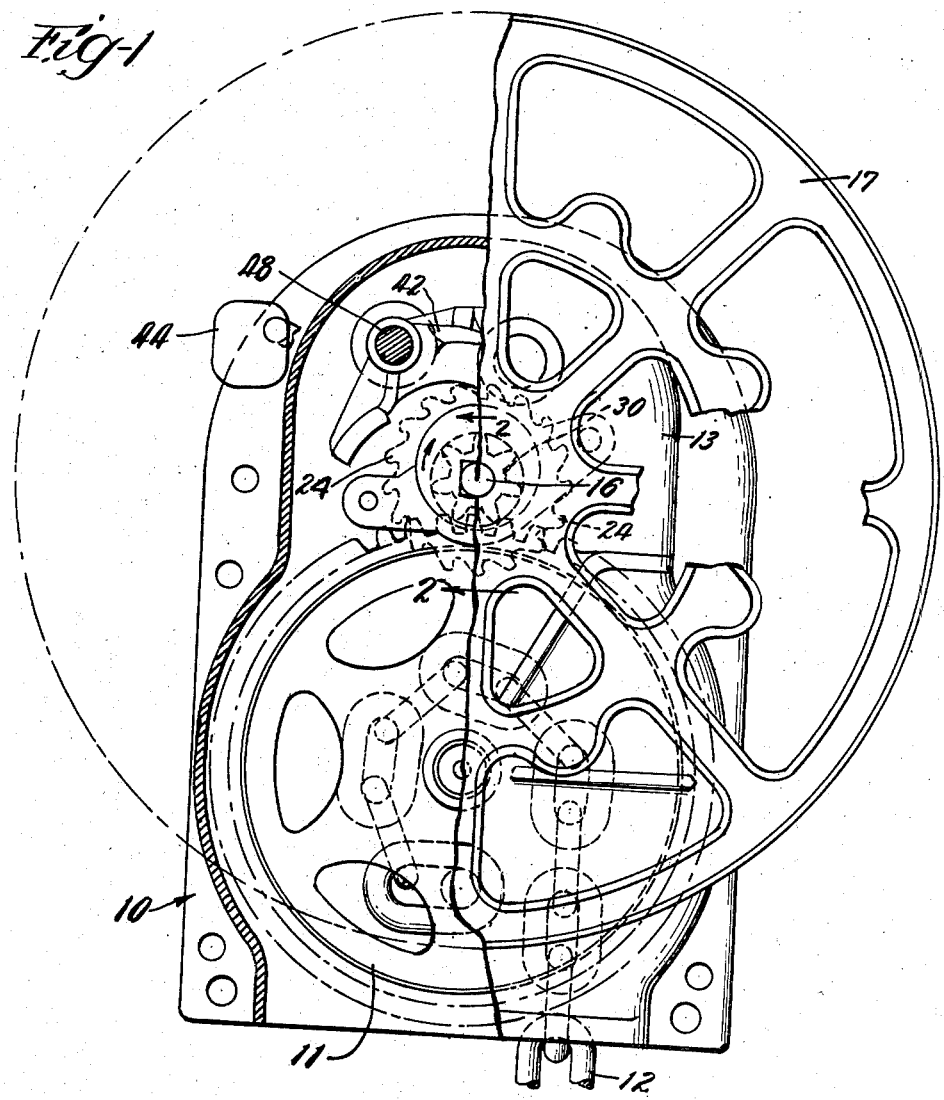

2,687,655

UNITED STATES PATENT OFFICE 2,687,655

GEARED HAND BRAKE

Neville R. Emery, Chicago, Ill., assignor to Ajax-Consolidated Company, Chicago, Ill., a corporation of Illinois Application May 23, 1951, Serial No. 227,825

7 Claims. (Cl. 74—505)

The present invention relates to an improvement in geared hand brakes for railway cars for the purpose of expediting and facilitating of the braking operation by substantially eliminating the waste of time normally involved in retrieveing slack or overrun of a brake applying chain relative to a brake drum. Such retrieve must be made in a conventional brake each time the brake is released.

Two different general types of geared hand brakes are in common use. One of these is characterized by a driving pinion for a brake drum gear which is directly and positively connected to a brake hand wheel, and it includes means to frictionally slow down retrograde brake releasing movement of the pinion and hand wheel in the form of a separate, manually applied brake. This brake acts on a pinion-connected ratchet which is normally engaged by a releasable holding pawl which functions to prevent retrograde movement of the pinion and hand wheel.

In another, clutch type hand brake, to which the principles of the present invention are particularly directed, the brake drum actuating pinion and the hand wheel shaft are wholly declutched in order to achieve quick release of the brake drum for brake releasing rotation. However, due to the torque which is then applied through the brake drum and gear to the pinion, plus the inertia of the rotating parts, the rotary members overrun far beyond the amount necessary to fully release the brake. In order to re-apply the brake it is first necessary that the hand wheel be repeatedly rotated by the brakeman to take up slack and restore tension on the drum-connected actuating chain, on account of the high ratio between the teeth of the drum gear and its driving pinion. Not only is this a nuisance, it is a source of danger because of the loss of time involved in resuming braking after brake release. Hence it is highly desirable that the waste time interval be eliminated, if this can be accomplished without sacrifice of the advantages of quick, full clutch release of the brake.

It is therefore a general object of the invention to provide an improved geared hand brake of the type described, characterized by a brake drum upon which a brake actuating chain is wound through the agency of a gear on the drum and an actuating pinion meshing with the gear, and further characterized by a releasable clutch connection between the actuating pinion and an operating hand wheel, in which these provisions are coupled with improved means to prevent undesirable excessive overrun of the drum gear and pinion once the brake has been fully released, thereby enabling the clutch connection between the hand wheel and pinion to be re-made, and braking to be resumed, without loss of substantial waste take up time.

It is another object of the invention to provide in a geared hand brake the combination of actuating pinion or the like, adapted to rotate freely relative to an operating hand wheel in a released condition due to a releasable clutch connection between the pinion and hand wheel or an associated part, the combination also preferably including a hand wheel holding ratchet and pawal to prevent retrograde movement of the pinion when the connection is in effect, and a friction unit built into the releasable connection which is automatically effective upon release of the latter to restrain free retrograde overrun of the pinion relative to the hand wheel, acting to halt rotation of the pinion immediately after it is relieved of positive brake drum torque accompanying release of the brake.

The foregoing statements are indicative in a general way of the nature of the invention. Other and more specific objects will be apparent to those skilled in the art upon a full understanding of the construction and operation of the device.

Two embodiments of the invention are presented herein for purpose of illustration. It will be appreciated that the invention may be incorporated in other modified forms coming equally within the scope of the appended claims.

In the drawings:

Fig. 1 is a fragmentary view in front elevation showing an installation of a brake drum housing, drum, gearing and brake wheel embodying the provisions of the invention, this view being partially broken away and in vertical transverse section to further illustrate the internal housing arrangement;

Fig. 2 is a fragmentary sectional view in enlarged scale taken axially of the brake hand wheel and pinion shaft, illustrating details of the shaft and pinion and a releasable jaw clutch connection therebetween, together with an improved anti-overrun, friction unit associated with the clutch;

Fig. 3 is a view in transverse vertical section along line 3—3 of Fig. 2; and

Fig. 4 is a fragmentary view in section generally similar to Fig. 2, illustrating a modified type anti-overrun control unit for the brake.

Referring to Figs. 1 and 2 of the drawings the reference numeral 10 generally designates a flanged brake drum housing of well known type which is ordinarily applied to an end wall of a railway car. The housing encloses a chain drum and gear, generally designated 11, a brake actuating chain 12 being secured to and wound about the drum in known manner. It is to be understood that the opposite end of the chain is connected to a brake shoe applying element, also in known manner, hence not requiring further illustration or description. The forward, outer wall 13 of the housing 10 is provided with an appropriate journal for the enlarged bearing portion 14 of a heavy hand wheel shaft 15, the latter being squared in section at 16 for the reception of the hand wheel 17 (Fig. 1) and being threaded at 18 to receive a securing nut.

Shaft bearing 14 has an enlarged annular shoulder or abutment 19 which is disposed internally of housing 10, immediately adjacent the forward wall 13 of the latter.

As illustrated in Fig. 2, the shaft 15, immediately to the right of shoulder 19, is shaped to provide a clutch and ratchet receiving portion 20 including a flattened surface 21. A combined clutch and ratchet member 22 is slidably received on the shaft portion 20 having an internal bore which is correspondingly shaped, so that the member 22 may slide axially on the shaft but is keyed from rotation relative thereto. Member 22 has an integral annular collar 23 which is engageable by a suitable shifter member 41, whereby the clutch-ratchet member may be axially moved on the shaft portion 20. It is also provided with a peripheral series of inclined ratchet teeth 24. Its face remote from the collar 23 is also shaped internally to provide an annular series of outwardly projecting jaw clutch teeth 25.

Shaft 15 extends rearwardly from the clutch receiving portion 20 thereof in the form of a reduced diameter journal portion 26 which is separated from the portion 20 by a radially extending abutment surface 27. Journal portion 26 may, if desired, be provided with a radially flanged bushing 28, positively fitted thereon with the radial flange 29 of the bushing in opposed relation to the abutment 27. This bushing will be applied to the shaft after installation of certain other provisions to be described.

A jaw carrying pinion 30 is rotatably mounted on the shaft extension 26 or its bushing 28, being entirely free for rotation relative to the shaft when de-clutched therefrom, as will be described. Pinion 30 has peripheral teeth 31 which are in constant mesh with the teeth of drum gear 11. The inner face of pinion 30 has formed thereon an annular series of clutch jaw teeth 32 which are adapted to mesh and lock with the jaw teeth 25 of the clutch-ratchet member 22 when the parts are engaged, i. e. in the position illustrated in Fig. 2.

In order to facilitate assembly of the parts, the shaft extension 26 may be provided with a rear nose portion 33 which is peripherally grooved for the reception of a split ring 34. The latter radially overlaps the end of pinion 30 and a locking collar 35 is driven over the same to hold the split ring in axial retaining relation to the pinion 30.

Referring to the embodiment illustrated in Figs. 2 and 3, I illustrate one style of anti-overrun control unit applied to the clutch connection between pinion 30 and hand wheel shaft 15. This comprises a hardened steel friction washer 36 axially sleeved over the shaft extension 26 immediately to one side of the flange 29 of pinion bushing 28. Washer 36 is provided with radially extending projections or ears 37 (see Fig. 3) which are adapted to interengage with clutch jaw teeth 32 on pinion 30, thereby locking the washer for rotation with the pinion. The washer is in direct axial thrust transmitting relation to the bushing flange 29.

A further friction washer 38 is disposed about extension 26 between the washer 36 and annular abutment 27 on shaft 15. Washer 38 is resiliently urged against washer 36, as by a plurality of uniformly distributed coil springs 39 received in recesses 40 in abutment 27, or their equivalent. The effect thereof is to maintain a substantial retarding pressure on the engaging disks 38, 36 and through them on the pinion 30.

In operation, with the parts in the relationship illustrated in Fig. 2, pinion 30 is drivingly engaged with shaft 15 through the clutch jaws 32, 25 and the keyed connection of member 22 to the shaft. The member 22 is manually disengaged from driving relation to pinion 30 by manipulation of the shifter 41. The latter is operated from the exterior of housing 10, by more or less conventional means including an operating arm 44. These operating provisions are not deemed to require further illustration. Shifting of member 22 to the left on shaft portion 20 (Fig. 2) disengages its teeth from the pinion 30, leaving the latter free for retrograde movement under torque applied to the brake actuating drum and gear 11 by chain 12. However, the spring actuated friction washers 36, 38 maintain sufficient restraint on the pinion that it overruns only slightly, if at all, when the brake has been fully released. Little or no take-up by hand wheel 17 is required to restore the brake to operative condition, once the clutch member 22 has been returned axially to clutching relation to the pinion 30 by shifter 41.

A modified adaptation of the invention is illustrated in Fig. 4, similar in all respects to the form shown in Fig. 2 save for the details of the particular anti-overrun control unit. Accordingly, like numerals are employed to designate parts common to both embodiments. In the form of Fig. 4 the friction elements consist merely of a hardened steel washer 45, held against rotation relative to pinion 30, as in the embodiment of Figs. 2 and 3, by interlock of its integral ears 45' with the clutch teeth 32 of the pinion. A conventional type of wave spring 46 urges the washer 45 against the abutment 27 of hand wheel shaft portion 20. The spring 46 is received in an end counterbore or recess 47 in pinion 30 which is located inwardly of its clutch teeth 32. It exerts sufficient axial force on washer 45 to provide the frictional anti-overrun control which is the object of the invention.

A bell crank shaped pawl 42 (Fig. 1) is pivoted on the brake housing at 43 and is maintained at all times in engagement with ratchet teeth 24 to lock the hand wheel against counterrotation.

I claim:

1. A geared hand brake comprising a gear actuating pinion, a shaft unit disposed coaxially of said pinion, said shaft unit comprising a shaft and a member mounted non-rotatively on said shaft to one side of said pinion, said pinion being mounted for rotation upon said shaft in axially fixed relation thereto, said member having relative axial sliding movement on said shaft and being provided with clutch means drivingly engageable and disengageable with said pinion by said relative axial movement, and anti-overrun means operatively disposed between said pinion and shaft unit, comprising a friction element in continual resilient end thrust transmitting relation between said unit and pinion to resist overrun of the latter on said shaft when de-coupled from said member.

2. A geared brake in accordance with claim 1 in which said anti-overrun means further comprises an annular spring compressed between said pinion and shaft unit, said spring being shaped in undulatory outline to impart inherent end resilience thereto.

3. A geared brake in accordance with claim 1 in which said anti-overrun friction element has separate springs acting thereon to urge the same resiliently.

4. A geared hand brake construction comprising a shaft unit, an actuating pinion mounted for free rotation upon said shaft unit in axially fixed relation thereto, a clutch member mounted for axial sliding, non-rotative movement on said shaft unit adjacent and to one side of said pinion, a ratchet integral with said clutch member said clutch member and pinion having clutch means engageable and disengageable by axial movement of said member on said shaft unit to lockingly engage the same for rotation as a unit, and anti-overrun means operatively disposed between said pinion and shaft unit, said last named means comprising a friction element resiliently urged continually in end thrust transmitting relation between said shaft unit and pinion to resist overrun of the latter on said shaft when said clutch means is disengaged.

5. A brake construction in accordance with claim 4 in which said anti-overrun means further comprises an annular spring compressed between said pinion and shaft unit, said spring being shaped in undulatory outline to impart end resilience thereto.

6. A geared hand brake construction comprising a shaft unit, an actuating pinion mounted for free rotation upon said shaft unit, a clutch member mounted for axial sliding, non-rotative movement on said shaft unit adjacent and to one side of said pinion, a ratchet integral with said clutch member, a pawl releasably engageable therewith to prevent rotation of said clutch member and shaft unit in one direction, said clutch member and pinion having clutch means engageable and disengageable by axial movement of said member on said shaft unit to lockingly engage the same for rotation as a unit, and anti-overrun means operatively disposed between said pinion and shaft unit, said last named means comprising a friction element resiliently urged continually in end thrust transmitting relation between said shaft unit and pinion to resist overrun of the latter on said shaft when said clutch means is disengaged.

7. A brake construction in accordance with claim 6 in which said anti-overrun means further comprises an annular spring compressed between said friction element and pinion, said spring being shaped in undulatory outline to impart end resilience thereto.

References Cited in the file of this patent

UNITED STATES PATENTS

| Number | Name | Date |
|---|---|---|
| 384,268 | Nelson | June 12, 1888 |
| 656,853 | Noble | Aug. 28, 1900 |
| 1,971,380 | Pearmain | Aug. 28, 1934 |
| 2,112,235 | Camp | Mar. 29, 1938 |
| 2,166,201 | Van Cleave | July 18, 1939 |
| 2,184,149 | Marr | Dec. 19, 1939 |
| 2,199,801 | Kattwinkel | May 7, 1940 |
| 2,267,037 | Meresereau | Dec. 23, 1941 |